Nov. 26, 1968     G. FERRAULT     3,412,908
SOWING MACHINE
Filed Aug. 22, 1966     2 Sheets-Sheet 2
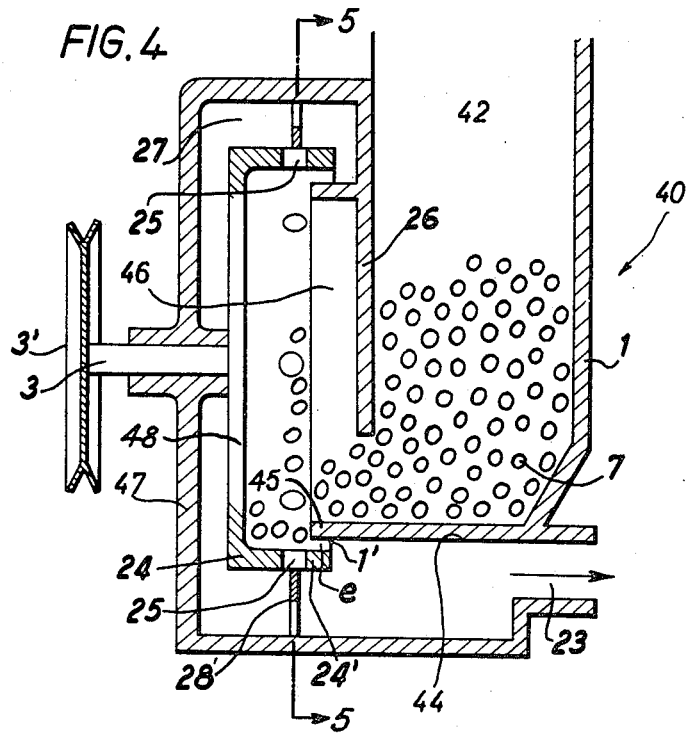
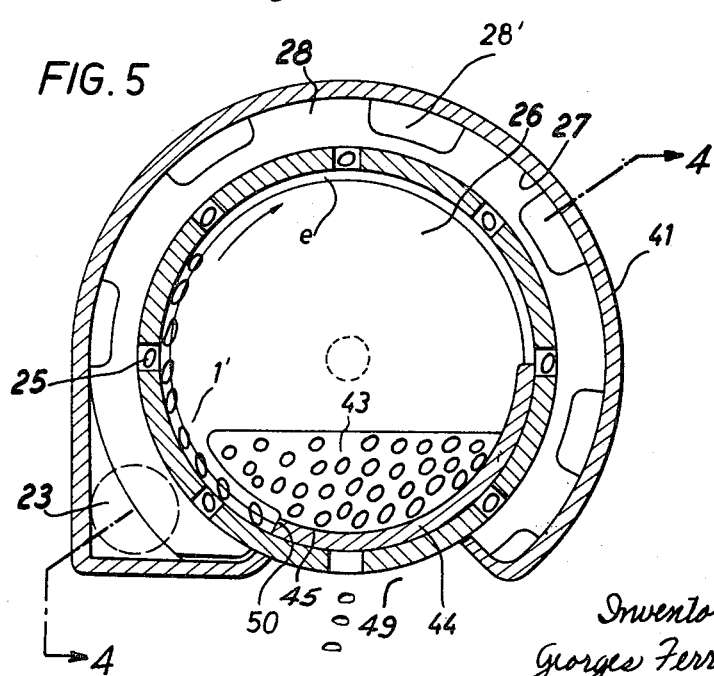
Inventor:
Georges Ferrault
By Baldwin, Wight, Diller & Brown
Attorneys

United States Patent Office

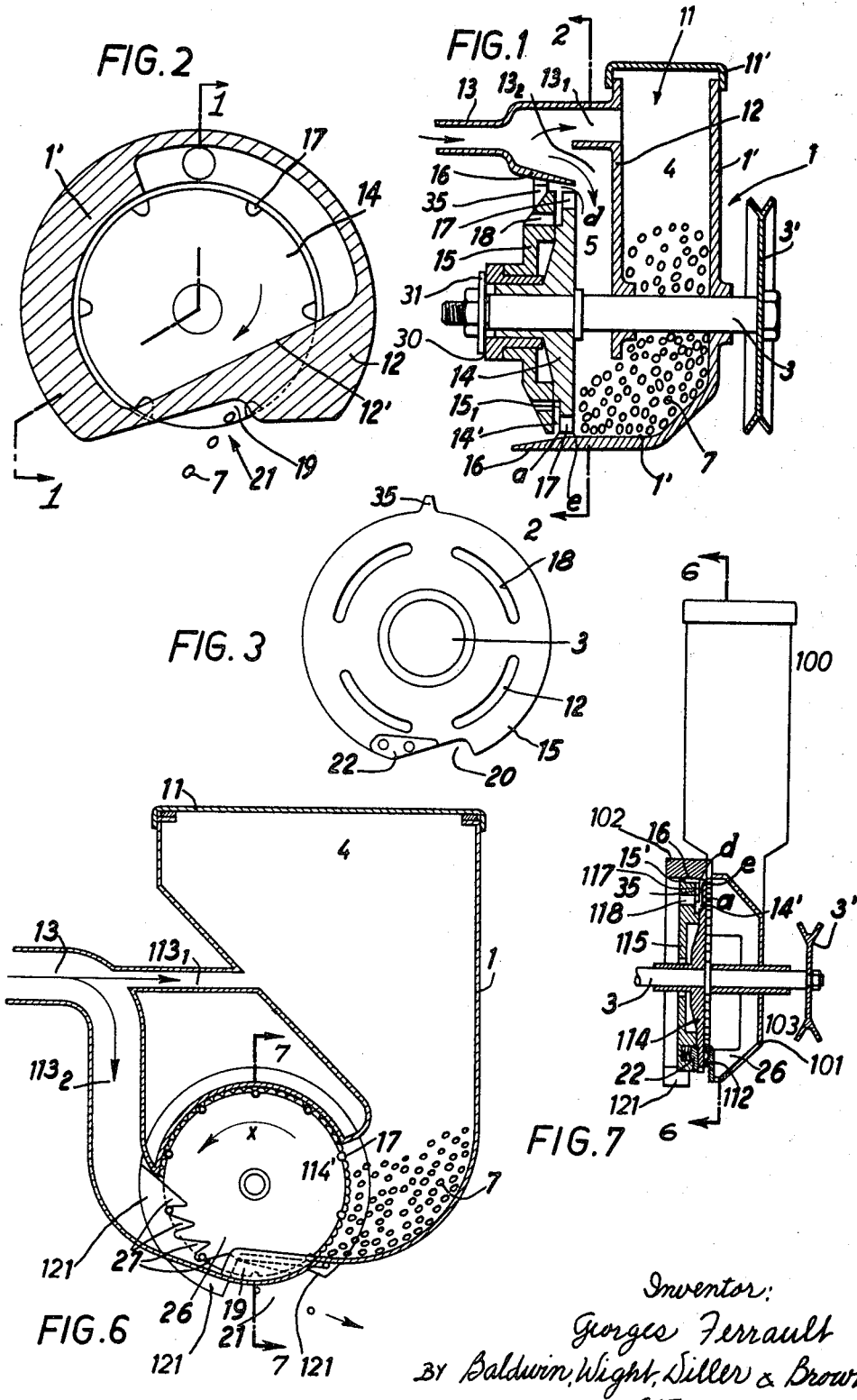

3,412,908
Patented Nov. 26, 1968

3,412,908
SOWING MACHINE
Georges Ferrault, Montereau, France, assignor to Societe Anonyme: Nodet-Gougis, Montereau (Seine-et-Marne), France, a corporation of France
Filed Aug. 22, 1966, Ser. No. 574,158
Claims priority, application France, Aug. 27, 1965, 29,728, Patent 1,457,515
10 Claims. (Cl. 222—194)

ABSTRACT OF THE DISCLOSURE

Seed distributing machines are disclosed herein including a seed storage and supply area, a rotatable distributor element and a non-rotatable distributor element. The rotatable distributor element is provided with slots suitable for accommodating a single seed during the rotation of the rotatable element and the non-rotatable distributor element is configured to allow the passage of seeds from the aforementioned slots to the exterior of the distributing machine during a sowing operation. Differential pressure is provided between the interior and exterior of the machine such that air flow past the two distributor elements aids in the dispensing of the seed.

---

This invention relates to precision seed distributing or sowing machines, i.e. machines capable of ensuring the correct placing at regular intervals of separate seeds in a drill or row.

With present equipment the seed sowing speeds are restricted with the consequent disadvantage that it is not possible to choose the most favourable period, often lasting only a short period at seed sowing time, when atmospheric conditions are often unsettled. To remedy this it has been suggested that seed sowing machines be used which comprise a rotary distributing element (disc or surface in cylindrical form) provided with picking up points for the seed grains, a container from which the seed is transferred to one face or side of the distributing element, a low-pressure chamber located on the other face of the distributor.

It has been established that such sowing machines have numerous disadvantages due to the difficulties inherent in the maintenance of a high degree of vacuum, the bulkiness of the equipment, to the fact that the powders with which seed grain is treated are drawn into the suction system, and that in spite of every precaution which might be taken, these seed sowing machines inherently suffer from the disadvantage that the correct sowing speed is still limited to a low figure.

Speaking generally, no known arrangement permits the seed to be picked up when the distributing element is operated at high speed. Seed sowers of the type under consideration have also been construction to include an agitator rotatable with the distributing element, or else the latter element has been given a special surface condition so as to discharge seeds in a stream at a speed approaching that at the picking up points.

The applicant having made a detailed study of the process of precision sowing at high working speeds and of the various conditions which require to be satisfied to ensure the correct placing of the separate grain whatever the working speed, it has become obvious that the ideal condition of precise placing of the grain in the drill is that it should reach the ground at a speed which is almost zero in relation to it, so as to prevent its rolling or rebounding from any uneven surface at the bottom of the drill. To achieve this end it is necessary for ejection of the grain from the distributing element to take place on a horizontal trajectory and at a speed relative to that of the seed distributing machine which is equal and opposite in direction to the speed of the latter. It is important to note that for a seeder operating at 8 km./h. (which is a suitable, if not preferred speed) the rate of ejection of the grains is 2.20 m./sec. which, if it is not desired to introduce intermediate acceleration, represents an equal speed for the picking up of the grains.

With this as the starting point, the basic principle of the present invention consists in imparting a rotary motion to the seed grains so as to advance them to pick up points at a speed substantially equal to and in the same direction as the speed of distribution. To obtain this result, air under pressure is applied on one side or the side above a distributor provided with a series of seed pick up points, such as spaced slots or recesses, the distributor being mounted to revolve in a housing, which is stationary, in relation to a clearance (or escape passage) between the housing and the distributor, in such a way that air escaping downstream will cause the grains to follow a path along the line of this clearance and in contact with the distributor. In this manner it is possible to set up acceleration of the seed to a speed approaching that of the distributor and to ensure that only those grains which are closest to the line of escape will be picked up and carried along, the other grains not being subjected to a contact pressure adequate to cause them to be carried along with the result that those seeds which are picked up will be ejected at high speed. To assist in carrying along the grains air can be blown in tangentially to the distributor in its direction of rotation.

It should be noted that since the only factor in the dynamic flow of air is the difference in pressure between the zones above and below, i.e. on opposite sides of the distributor, it is clear that identical results would be obtained whether an atmospheric pressure was made to prevail in the zone above and a negative pressure in the zone below it, instead of providing, as in the case described above, atmospheric pressure in the zone below and excess pressure in the zone above the distributor. It is more advantageous, however, to work with excess pressure because:

(1) To obtain positive air pressure does not involve technical difficulties as does negative pressure and greater pressure differentials can more readily be obtained with excess pressure than with negative pressure;

(2) Since the seeds are generally treated with powder prior to sowing, operations carried out under negative pressure result in powder and other impurities being sucked in and subsequently blocking the pneumatic circuit, which difficulty does not arise with operations under pressure;

(3) Operations under negative pressure require a chamber at negative pressure beneath the distribution member, which increases the bulkiness of the equipment, any increase in size being difficult to accept when it is required to find space to accommodate a device for burying seeds in the ground;

(4) The necessity of isolating the seed grain from action by the air at the moment of release has led to the interposition between the distributor and the hopper containing the grains of an airtight component; should the seal not be airtight, in equipment working at negative pressure, the residual underpressure holds the grain back towards the hopper and prevents satisfactory ejection; at present it is not possible to remedy this disadvantage except by providing evacuation pressure which would require an additional air circuit.

The improvement in a seed distributing or sowing machine comprising a container for the seed incorporating a rotating distributor having pick up points in the form of slots or recesses and provided with pneumatic means acting on the distributor consists essentially, according to the present invention, in that the distributor comprises a rotatable element mounted to rotate in the opening of the container and having slots or recesses disposed at regular intervals over its periphery, a non-rotatable element, coaxial with the rotating element, and provided with at least one slot for discharge of the seed and means for creating a pressure difference between the zones respectively above and below or on opposite sides of said elements by producing a current of air, which may flow from above downward, said coaxial element cooperating with the air flow to support the seed grains at the pickup points, a clearance being formed for the passage of air between the wall of the container and the rotating and stationary elements.

The means for producing the air flow preferably consists of a source of compressed air which acts simultaneously on one face of the distributor element and on the seed in the reservoir but leaving the other face of the distributor element free.

The size of the slots or apertures, the position of the non-rotatable element and the air pressure are chosen in relation to the nature of the seed to be distributed and the required sowing speed.

The distributor, which is preferably bell-shaped, may be provided with external means of feed and ejection, or with pickup means in the interior and ejection means on the exterior. Alternatively, the distributor may be in the form of a disc having peripheral slots with lateral pickup means and radial ejection.

The invention is illustrated in the accompanying drawings in which:

FIGURE 1 is a vertical section (on the lines 1—1 of FIGURE 2) of a seed distributing machine in accordance with one embodiment of the invention;

FIGURE 2 is a corresponding section on the line 2—2 of FIGURE 1;

FIGURE 3 is a plan view of the non-rotatable element of the distributor shown in FIGURE 1;

FIGURE 4 is a vertical section on an enlarged scale (on the line 4—4 of FIGURE 5) of a second embodiment of the invention;

FIGURE 5 is a section of the line 5—5 of FIGURE 4;

FIGURE 6 is a section on the line 6—6 of FIGURE 7 of a modification of the embodiment shown in FIGURE 1 in which a tangential intake of air underpressure co-operates with an escape line for discharge of the grains;

FIGURE 7 is a section on the line 7—7 of FIGURE 6.

Referring to FIGURES 1–3 of the drawings there is shown a seed distributor machine comprising a container, indicated generally at 1, for the seed grains 7, having a filling aperture 11 closed by a cover 11'. The chamber within container 1 is divided into two zones, 4, 5, by a partition wall 12, access to which zones is through ducts $13_1$, $13_2$ leading out of a pipe 13 connected to a source of air pressure.

Release of the seed from the chamber 4 is through an opening beneath a bridge into chamber 5, the bottom side wall or walls of chamber 4 being on an incline as indicated at 12' in FIGURE 2.

On the discharge side of container is a circular opening terminating in a conical or tapering wall portion 16 with which the distributor components 14, 15 are mounted. Component 14, which consists of a disc having circumferentially spaced slots 17, is keyed to a spindle 3 journalled to revolve in suitable bearings in the walls 12 and 1', 3' being a drive pulley.

A second and non-rotating disc 15 is coaxially mounted on spindle 3 by means of a shouldered sleeve 30 held to the spindle by a nut and washer 31, the disc being held against rotation by a lug 35 engaged in a selected one of a number of radial grooves in the wall 16, one of which is shown at 16', so that its angular position can be adjusted. It should be understood that the slots 17, the profile of which can be varied to suit the seeds to be sown, are cut at equal distances from one another in the periphery of the disc 14, a clearance (or escape gap) $e$ likewise variable in size to suit the seed being formed between the periphery of the rotating disc 14 and the fixed wall 16. The stationary disc 15, which has a certain number of arcuate apertures 18 cut in it, concentric with the shaft 3, has also a predetermined clearance $d$ formed between its perimeter and the wall 16.

It should be noted that the disc 14 is of stepped formation so as to provide clearance indicated at $a$ between the opposite radial surfaces 14', 15' respectively of the discs 14 and 15. The non-rotatable disc 15 and the wall 12 are cut away at 19 and 20 respectively to provide passages in the exit zone 21 of the grains 7. The disc 14 is provided with a flat 22 which rubs against the face 14' of the disc.

In operation appropriate pressure is transmitted by means of the pipe 13 and the ducts $13_1$ and $13_2$ in order to ensure that there is no resistance to the caving-in under gravity of the seed grains in the container 1. A disc 14 having been selected and fitted to spindle 3 with slots 17 to match the dimensions of the grains, the machine is set in rotation. The disc 15 tends to support or hold back seed present in the slots 17, subject to the force of air under pressure acting towards it. The air traverses the disc 14 through the peripheral clearance $e$ between it and the fixed surface 16 and by the slots 17. The peripheral clearance $d$ between disc 14 and the wall surface 16 together with the perforations 18 in the disc 15 facilitate escape of the air pressure to atmosphere. As the surface 16 is conical the clearance $d$ becomes bigger as the total thickness of the distributor increases, i.e. with increasing size of the grains.

The grains enter the slots 17 in a direction parallel to the axis of the spindle 3 and no opposition is offered to this introduction by centrifugal force at high rotational speeds. It will be obvious also that there is no need to change anything but the disc 14 when there is a change in the type of seeds to be sown.

The machine of this invention further ensures a powerful jet form of release of the grain seed at the moment of its ejection, the partition wall 12' and the non-rotating disc 15 being disengaged by the openings 19 and 20 in the zone 21. The flap 22 helps to force the ejection of a grain seed from a notch 17 if necessary by its rubbing action on the face 14' of the disc 14.

The seed grains are arranged in an orderly manner in the seed pickup zone by the rotating disc 14, which facilitates the pickup operation.

The peripheral clearance $e$ provided between the disc 14 and the surface 16 ensures an orderly arrangement. The grains are maintained in position along this line by air pressure and hence are carried along by friction by means of the disc 14. Outside the forwarding zone the grains in contact with the smooth face of disc 14 but without any air pressure are not carried along. When in position along this outlet line $e$ with a certain speed the grains are ready to be picked up by the notches 17. This arrangement is favoured still further by the surface conditions and a suitable superficial geometry of the periphery of the disc 14 and of the fixed wall 1'.

Referring now to FIGURES 4 and 5, in this embodiment, which utilises suction in the release of the seeds from the storage chamber, the apparatus comprises a substantially rectangular casing indicated generally at 40, having on one side a circular boss 41, communication between the storage section 42, within which the grains 7 are received, and the interior chamber 27 being through a segmental orifice 43 provided beneath a partition wall 26 separating the two chambers 42 and 27.

The bottom of the chamber 42 is bounded by an arcuate wall section 44 which forms part of an interior flange 45 on the partition wall 26 and extending into the chamber 47, the circular flange so formed and indicated at 46 in FIGURE 4 being concentric with the axis of the drive spindle 3 and its pulley 3'; the spindle 3 is journalled to revolve in a bearing in the opposite side wall 47 of the boss 41.

Fixed on the spindle 3 is a dispensing member in the form of a disc 48 having a cylindrical flange 24 provided with circumferentially spaced slots 25 of a predetermined size to accommodate a single one of the seeds 7 to be distributed. As can be seen from FIGURE 5, the boss 41 has a bottom opening 49 providing a discharge outlet for the seeds so that when, as explained hereinafter, one of the seeds 7 within a slot 25 and the slot in question is opposite the opening 49, it will be released.

The annular space enclosed between the flange 24 and the circular wall of the boss 41 provides a negative pressure chamber 27, the pressure in which is maintained by connection of a duct 23 to a source of vacuum.

It will be seen that the relative sizes of the flanges 24 and 46 is such as to provide a clearance $e$ therebetween so that seed passing from chamber 42 into the inside of the distributor member 48 will tend to be drawn into position opposite the gap $e$, as shown by the ring formation of the seeds, indicated at 7' in FIGURE 5, with the result that when the machine is started and the distributor member 48 revolves, the seeds 7 become strung out in a line along the peripheral gap $e$; it follows that in operation only one seed normally can fall into the empty orifice 25, as the latter again enters the negative pressure chamber 27, the seed previously in position within the particular orifice having been discharged through the gap 49, as the orifice moved past the radially extending edge 50 of the bottom wall 45 of chamber 42.

In order to retain the seeds in position as they successively enter the orifices 25 in the revolving member 46 and prevent them being thrown out by centrifugal force there is provided an annular plate 28 which encloses the perimeter of the flange 24 within chamber 27. Circumferentially spaced apertures 28' in the plate 28 provide communication between the suction 23 and the negative pressure chamber 27.

Referring now to FIGURES 6 and 7 which show a modification of the embodiment of FIGURES 1–3 wherein air underpressure is introduced on opposite sides of a revolving distributor disc 14 (FIGURE 1) the apparatus is modified in that the seed storage hopper comprises a casing 100 terminating at its lower end in a truncated conical section 101 formed with a radial face 112 for co-operation with an annular base casting 102 and between which is mounted to revolve a distributor within which is secured a back plate 115 corresponding to the non-rotatable disc member 14, the back plate being held against rotating by a lug 35 engaging a recess in the casting. In the disc 114 are peripheral slots 17 as in the FIGURE 1 embodiment; the disc being fixed on a spindle 3 journalled to revolve in a tubular bearing 103 formed in the casing 101.

In this embodiment the air duct 13 divides into two passages $113_1$ and $113_2$ the former entering the hopper chamber 4 and the latter connecting with the chamber 26 of casing 101 through a circumferential orifice 105 in the wall thereof. Orifices 118 in the back plate 115 provide for escapement of air to atmosphere. It will be understood that the seeds from the hopper 4 move by gravity into the chamber 26 and virtually cover the whole of the inside face indicated at 114' in FIGURE 6 of the distributor disc 114. Where they are subjected to the action of the tangential air stream entering from the duct $113_2$, which in the chamber 26, direction of rotation of the distributor disc 114 is indicated by arrow X.

In contact with the surface 114' of distributor disc 114 is a metal strip 127 having tongues 27 between which are gaps, the tongues overlying a peripheral section of the face 114' of the distributor plate, and the bottom of the gaps being arranged to coincide with the perimeter of the disc so that when a slot 17 in the disc coincides with a gap, a seed grain can pass therethrough and enter the slot, which seeds are then carried forward and are released in the discharge zone 21 to provide for which the casting 102 is cut away as indicated at 121. Mounted between the fixed disc 115 and the revolving disc 114 is a rubbing plate 22.

Obviously as many seed distributing machines according to the invention may be incorporated in a sowing machine as there are passages provided for the sowings.

What is claimed is:

1. A seed distributing device comprising a hopper for the seed, a discharge chamber into which seed from the hopper feeds by gravity and having a discharge orifice, means including rotatable and non-rotatable distributor elements mounted in the discharge orifice for controlling the release of seed therefrom and so arranged as to provide a peripheral passage for flow of air from the discharge chamber, the rotatable element having a series of peripherally spaced slots of a capacity to accommodate seed of predetermined size, means in cooperative relation with the non-rotatable element to permit successive release of seeds one by one and means connecting the interior of the hopper and discharge chamber to a source of pressure so as to set up an air flow through the passage to assist in effecting discharge of the seed when released by the distributor means.

2. A seed distributor device as claimed in claim 1 in which the non-rotatable element has a peripheral slot to control release of seed by the rotatable element.

3. A seed distributing device as claimed in claim 2 wherein the hopper and discharge chamber form part of a casing and comprising means for connecting the casing to a source of pressure including ducts which open into both the hopper and discharge chambers.

4. A seed distributing device as claimed in claim 3 in which the non-rotatable element is provided with additional apertures for passage of air.

5. A seed distributing device comprising a casing formed in two parts, a first part including a hopper for the seed and a discharge chamber of truncated conical section, a second part including an annular base section, said annular base section providing a discharge orifice for the seed, means on the casing and base section by which the casing is detachably secured to the base section, a spindle journalled to revolve in bearings in the said casing, a rotary distributor member carried by said spindle, a stationary distributor member for co-operation with the rotary member, both members being mounted in the discharge orifice within the annular base section to control the release of seed from the discharge chamber, said rotary member having circumferentially spaced slots to receive seeds, means in surface contact with said rotary member to restrict entry of seeds into said slots, said stationary member having an aperture to permit discharge of seed therefrom as the rotary member revolves means for connecting the hopper and discharge chamber to a source of pressure and said rotary distributor member and said stationary distributor member being spaced to provide an air flow channel for allowing air flow therethrough resultant from an increased pressure in said hopper and discharge chamber to assist in seed discharge from said distributing device.

6. A seed distributing device as claimed in claim 5 in which the means for restricting entry of seed into the slots in the rotary distributor member comprises a feed plate having tongues overlapping the perimeter of said member, the gaps between said tongues being positioned to permit entry of seed to each slot one by one.

7. A seed distributing device as claimed in claim 6 wherein the connection between the discharge chamber and the source of pressure comprises a duct which is tangential to the perimeter of the chamber.

8. A seed distributing device comprising a casing defined by side walls and a bottom wall joining the side walls, a partition wall dividing the interior of the casing into hopper and discharge chambers, said partition wall having a bottom wall through which seed passes by gravity into the discharge chamber, a spindle journalled to revolve within bearings in the side wall of the discharge chamber, a discharge orifice in said chamber to permit of discharge of seed therein, a distributor member fast on the spindle and mounted to revolve within the discharge chamber, said distributor member having a cylindrical flange in which are radial slots to receive seeds from the discharge chamber, the bottom of the seed hopper being defined by an arcuate flange portion which extends circumferentially with respect to the discharge orifice in the discharge chamber, the partition wall having an annular flange portion, said arcuate and annular flange portions extending coaxially within said cylindrical flange so that seeds from the hopper are presented to the slots in the cylindrical flange, ring means extending circumferentially within the discharge chamber and overlying the slots in said cylindrical flange to prevent release of seed therefrom whereby seeds are released one by one as the distributor member revolves and said slots successively are in registration with the discharge orifice and means for connecting the discharge chamber to a source of vacuum in order to induce an air flow in the direction of discharge of the seeds.

9. A seed distributing device as claimed in claim 8 in which the cylindrical flange of the distributor and the stationary flange are dimensioned to provide a flow passage for air.

10. A seed distributing device as claimed in claim 9 in which the distributor chamber is of circular section and the ring means comprises an annular plate of a diameter to bridge the space between the cylindrical flange and the wall of the discharge chamber, slots being provided in said plate to provide direct flow communication between the hopper and discharge chambers.

References Cited

UNITED STATES PATENTS

| 1,638,048 | 8/1927 | Matheson | 222—194 |
| 2,152,632 | 4/1939 | Cassiere | 222—194 X |

ROBERT B. REEVES, *Primary Examiner.*

HADD S. LANE, *Assistant Examiner.*